(12) United States Patent
Park (10) Patent No.: US 12,444,307 B2
(45) Date of Patent: Oct. 14, 2025

(54) VEHICLE AND CONTROLLING METHOD THEREOF

(71) Applicant: HL KLEMOVE CORP., Incheon (KR)

(72) Inventor: Jiyeol Park, Seoul (KR)

(73) Assignee: HL KLEMOVE CORP., Incheon (KR)

(*) Notice: Subject to any disclaimer, the term of this patent is extended or adjusted under 35 U.S.C. 154(b) by 168 days.

(21) Appl. No.: 18/243,247

(22) Filed: Sep. 7, 2023

(65) Prior Publication Data

US 2024/0331547 A1 Oct. 3, 2024

(30) Foreign Application Priority Data

Mar. 29, 2023 (KR) .................. 10-2023-0040908

(51) Int. Cl.
*G08G 1/16* (2006.01)
*B60W 30/16* (2020.01)

(52) U.S. Cl.
CPC .......... *G08G 1/167* (2013.01); *B60W 30/162* (2013.01); *G08G 1/162* (2013.01); *B60W 2420/403* (2013.01); *B60W 2420/408* (2024.01); *B60W 2554/801* (2020.02); *B60W 2554/804* (2020.02)

(58) Field of Classification Search
CPC ..... G08G 1/167; G08G 1/162; B60W 30/162; B60W 2554/804; B60W 2554/801; B60W 2420/408; B60W 2420/403
See application file for complete search history.

(56) References Cited

U.S. PATENT DOCUMENTS

| | | | |
|---|---|---|---|
| 11,242,051 B1* | 2/2022 | Konrardy | G08G 1/096725 |
| 2016/0167579 A1* | 6/2016 | Hwang | G08G 1/163 |
| | | | 340/435 |
| 2017/0076605 A1* | 3/2017 | Suzuki | G08G 1/133 |
| 2017/0351255 A1* | 12/2017 | Anderson | G01C 21/3453 |
| 2019/0031186 A1* | 1/2019 | Hardee | G05D 1/0088 |
| 2019/0278279 A1* | 9/2019 | Hase | B60W 30/09 |
| 2019/0392712 A1* | 12/2019 | Ran | G08G 1/0116 |
| 2022/0262251 A1* | 8/2022 | Nakagawa | G08G 1/161 |
| 2024/0381074 A1* | 11/2024 | Newman | H04W 8/26 |

FOREIGN PATENT DOCUMENTS

| | | |
|---|---|---|
| JP | 2021-152488 A | 9/2021 |
| KR | 10-2014-0025096 A | 3/2014 |
| KR | 10-2019-0126258 A | 11/2019 |

* cited by examiner

*Primary Examiner* — Naeem Taslim Alam
(74) *Attorney, Agent, or Firm* — Hauptman Ham, LLP

(57) ABSTRACT

Disclosed herein is a vehicle including: a communication unit configured to communicate with a nearby vehicle; a memory configured to store at least one piece of degree-of-risk information of first degree-of-risk information corresponding to each type of a pre-designated load or second degree-of-risk information corresponding to each weight of a pre-designated load; and a processor communicatively or electrically connected to the communication unit and the memory, wherein the processor determines a degree of risk of an object loaded in the vehicle based on information on at least one of a type or weight of the object loaded in the vehicle and the at least one piece of degree-of-risk information stored in the memory and controls the communication unit such that information including the determined degree of risk is transmitted to the nearby vehicle.

20 Claims, 5 Drawing Sheets

VEHICLE AND CONTROLLING METHOD THEREOF

CROSS-REFERENCE TO RELATED APPLICATION

This application claims the benefit of Korean Patent Application No. 10-2023-0040908, filed on Mar. 29, 2023 in the Korean Intellectual Property Office, the disclosure of which is incorporated herein by reference.

BACKGROUND

1. Field

Embodiments of the present disclosure relate to a vehicle to which vehicle to everything communication (V2X communication) technology is applied and a controlling method thereof.

2. Description of the Related Art

Vehicle to everything communication (V2X communication) technology is technology in which a vehicle exchanges information with other vehicles, mobile devices, and/or things on a road through a wired and/or wireless communication network.

Recently, V2X communication technology has been applied to most vehicles. Accordingly, as a vehicle acquires information on traffic conditions around the vehicle, information for the driving convenience of a driver, and/or other information, provides the information to the driver, and/or utilizes the information in driving control of the vehicle, related technology is being developed.

In particular, technology development for improving the driving safety of a vehicle through information acquired while driving a vehicle is actively progressing.

However, among technologies for improving the driving safety of a vehicle that have been developed so far, technology for acquiring information that a moving vehicle requires to pay attention to nearby vehicles has not been developed.

For example, in a case where a transportation vehicle loaded with a dangerous object travels near a travelling vehicle, a driver of the travelling vehicle may not know exactly what object the transportation vehicle is transporting, and accordingly, the driver may drive with a lack of awareness about the transportation vehicle.

However, if an object falls from the transportation vehicle loaded with the dangerous object, the travelling vehicle may hurriedly try to avoid the object that has fallen on a road, and thus a traffic accident may occur or the vehicle may collide with the object that has fallen on the road. In addition, a collision accident may occur between the travelling vehicle and the transportation vehicle, and at this time, a large fire may occur due to the object.

Accordingly, it is necessary to develop technology capable of preventing such situations.

SUMMARY

Therefore, it is an aspect of the present disclosure to provide a vehicle capable of sharing degree-of-risk information on an object transported by the vehicle with nearby vehicles and a controlling method thereof.

It is another aspect of the present disclosure to provide a vehicle capable of inducing nearby vehicles to pass the vehicle and travel in a case where a degree of risk of an object transported by the vehicle is high and a controlling method thereof.

It is still another aspect of the present disclosure to provide a vehicle capable of preventing an accident due to an object of the vehicle falling through control of a driving assistance function of the vehicle by itself in a case where a degree of risk of the object transported by the vehicle is high and a controlling method thereof.

It is yet another aspect of the present disclosure to provide a vehicle capable of acquiring degree-of-risk information and/or information for inducing the vehicle to pass an object transportation vehicle from the object transportation vehicle such that a driver of the vehicle drives with awareness about the object transportation vehicle and a controlling method thereof.

It is yet another aspect of the present disclosure to provide a vehicle capable of acquiring degree-of-risk information and/or information for inducing the vehicle to pass an object transportation vehicle from the object transportation vehicle and controlling driving (or referred to as autonomous driving and a controlling method thereof.

In accordance with one aspect of the present disclosure, a vehicle includes: a communication unit configured to communicate with a nearby vehicle; a memory configured to store at least one piece of degree-of-risk information of first degree-of-risk information corresponding to each type of a pre-designated load or second degree-of-risk information corresponding to each weight of a pre-designated load; and a processor communicatively or electrically connected to the communication unit and the memory, wherein the processor determines a degree of risk of an object loaded in the vehicle based on information on at least one of a type or weight of the object loaded in the vehicle and the at least one piece of degree-of-risk information stored in the memory and controls the communication unit such that information including the determined degree of risk is transmitted to the nearby vehicle.

The vehicle may further include an input device configured to receive information according to a user's manipulation, wherein the processor may acquire the information on the at least one of the type or weight of the object loaded in the vehicle through the input device.

The memory may further store vehicle control information corresponding to each pre-designated degree of risk, and the processor may control the vehicle based on the determined degree of risk and the vehicle control information corresponding to each pre-designated degree of risk stored in the memory.

The vehicle control information corresponding to each pre-designated degree of risk may include information for at least one control of control of changing a speed of the vehicle, control of an intervehicle distance between the vehicle and the nearby vehicle, control of changing a collision warning time point of the vehicle, or control of a lateral position of the vehicle.

The vehicle control information corresponding to each pre-designated degree of risk may include information for at least one control of the control of changing the speed of the vehicle such that the speed of the vehicle decreases as the determined degree of risk increases, the control of the intervehicle distance between the vehicle and the nearby vehicle such that the intervehicle distance between the vehicle and the nearby vehicle increases as the determined degree of risk increases, the control of changing the collision warning time point of the vehicle such that the collision warning time point of the vehicle is advanced as the determined degree of risk increases, or the control of the lateral position of the vehicle such that the vehicle is located in a center as the determined degree of risk increases.

The vehicle may further include at least one sensing device of a camera, a radar, or a LiDAR, wherein the processor may control the communication unit such that information for inducing the other vehicle to pass the vehicle is transmitted to the other vehicle based on surrounding information of the vehicle identified through output data of the at least one sensing device.

The processor may control the communication unit such that the information for inducing the other vehicle to pass the vehicle is transmitted to the other vehicle in a case where the determined degree of risk is greater than or equal to a pre-designated reference degree of risk.

The processor may determine whether the other vehicle is able to pass the vehicle in a case where the determined degree of risk is greater than or equal to a pre-designated reference degree of risk and control the communication unit such that the information for inducing the other vehicle to pass the vehicle is transmitted to the other vehicle in a case where it is determined that the other vehicle is able to pass the vehicle.

The processor may determine that the other vehicle is able to pass the vehicle according to a determination that the number of travel lanes for the vehicle is two or more or a lane line around the travel lane for the vehicle is a lane line indicating that passing is induced and no vehicle is present in front of and at either side of the vehicle based on the surrounding information of the vehicle.

The processor may determine that the other vehicle is able to pass the vehicle further based on a determination that a curvature of the travel lane for the vehicle according to the surrounding information of the vehicle is smaller than a pre-designated reference curvature.

In accordance with another aspect of the present disclosure, a controlling method of a vehicle includes: determining a degree of risk of an object loaded in the vehicle based on information on at least one of a type or weight of the object loaded in the vehicle and at least one piece of degree-of-risk information of first degree-of-risk information corresponding to each type of a pre-designated load or second degree-of-risk information corresponding to each weight of a pre-designated load stored in advance; and transmitting information including the determined degree of risk to a vehicle near the vehicle.

The controlling method of a vehicle may further include acquiring the information on the at least one of the type or weight of the object loaded in the vehicle based on a user's input through an input device of the vehicle.

The controlling method of a vehicle may further include controlling the vehicle based on the determined degree of risk and vehicle control information corresponding to each pre-designated degree of risk stored in advance.

The vehicle control information corresponding to each pre-designated degree of risk may include information for at least one control of control of changing a speed of the vehicle, control of an intervehicle distance between the vehicle and the nearby vehicle, control of changing a collision warning time point of the vehicle, or control of a lateral position of the vehicle.

The vehicle control information corresponding to each pre-designated degree of risk may include information for at least one control of the control of changing the speed of the vehicle such that the speed of the vehicle decreases as the determined degree of risk increases, the control of the intervehicle distance between the vehicle and the nearby vehicle such that the intervehicle distance between the vehicle and the nearby vehicle increases as the determined degree of risk increases, the control of changing the collision warning time point of the vehicle such that the collision warning time point of the vehicle is advanced as the determined degree of risk increases, or the control of the lateral position of the vehicle such that the vehicle is located in a center as the determined degree of risk increases.

The controlling method of a vehicle may further include transmitting information for inducing the other vehicle to pass the vehicle to the other vehicle based on surrounding information of the vehicle identified through output data of at least one sensing device of a camera, a radar, or a LiDAR.

The transmitting of the information for inducing the other vehicle to pass the vehicle to the other vehicle may be performed in a case where the determined degree of risk is greater than or equal to a pre-designated reference degree of risk.

The controlling method of a vehicle may further include determining whether the other vehicle is able to pass the vehicle in a case where the determined degree of risk is greater than or equal to a pre-designated reference degree of risk, wherein the transmitting of the information for inducing the other vehicle to pass the vehicle to the other vehicle may be performed in a case where it is determined that the other vehicle is able to pass the vehicle.

The determining that the other vehicle is able to pass the vehicle may be based on a determination that the number of travel lanes for the vehicle is two or more or a lane line around the travel lane for the vehicle is a lane line indicating that passing is induced and no vehicle is present in front of and at either side of the vehicle according to the surrounding information of the vehicle.

The determining that the other vehicle is able to pass the vehicle may be further based on a determination that a curvature of the travel lane for the vehicle according to the surrounding information of the vehicle is smaller than a pre-designated reference curvature.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like reference numerals denote like elements throughout the specification. In the specification, all elements of the embodiments are not described, and general contents in the art or repeated contents between the embodiments will not be described. Terms such as parts, modules, members, and blocks may be realized using a software or hardware, and a plurality of parts, modules, members, and blocks are realized in a single element, or one part, module, member, or block may also include a plurality of elements.

Throughout the specification, when a part is referred to as being "connected" to another part, it includes "directly connected" to another part and "indirectly connected" to another part, and the "indirectly connected" to another part includes "connected" to another part through a wireless communication network.

In addition, when a part "includes" an element, another element may be further included, rather than excluding the existence of another element, unless otherwise described.

Throughout the specification, when a member is referred to as being "on" another member, the member is in contact with another member or yet another member is interposed between the two members.

Terms such as first, second, and the like are used herein to distinguish one element from another element, and the elements are not limited to the above-described terms.

As used herein, singular forms "a" and "an" are intended to include the plural forms as well, unless the context clearly indicates otherwise.

Reference numerals in operations are used for the sake of convenience in description and do not describe an order of the operations, and the operations may be performed through an order different from the described order unless the context clearly indicates a specific order.

Hereinafter, an operational principle and embodiments of the disclosure will be described with reference to the accompanying drawings.

Figure 1:
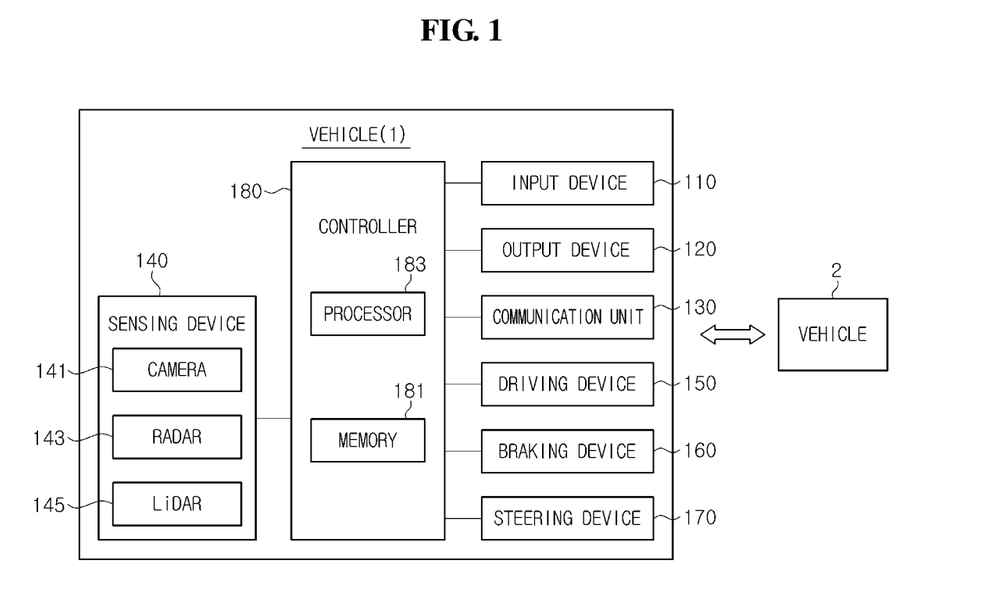
FIG. 1 is a diagram showing a configuration of a vehicle according to one embodiment.

FIG. 1 is a diagram showing a configuration of a vehicle according to one embodiment.

Referring to FIG. 1, a vehicle 1 (also referred to as a first vehicle 1) may include an input device 110, an output device 120, a communication unit 130, a sensing device 140, a driving device 150, a braking device 160, a steering device 170, and/or a controller 180.

Components of the vehicle 1 (for example, the input device 110, the output device 120, the communication unit 130, the sensing device 140, the driving device 150, the braking device 160, the steering device 170, and/or the controller 180) may be connected to each other through a vehicle communication network and/or a hard wire which will be described below.

The input device 110 may receive information according to a user's (for example, driver's) manipulation and may transmit the input information to a connected device, for example, the controller 180.

For example, the input device 110 may include a button, a switch, a touch screen, and/or a microphone.

For example, the user may input the type and/or weight of an object loaded in the vehicle 1 through the input device 110, and accordingly, the controller 180 may acquire information indicating the type and/or weight of the object loaded in the vehicle 1.

The output device 120 may output visual information and/or auditory information such that occupants in the vehicle 1 and/or people near the vehicle 1 may check the corresponding information.

For example, the output device 120 may include a display device (for example, a digital cluster or the like) and/or a speaker.

The communication unit 130 may support the establishment of a wired and/or wireless communication channel between the vehicle 1 and an external device, for example, a vehicle 2, and communication to perform through the established communication channel and may include a communication circuit and/or a control circuit for controlling operation of the communication circuit. For example, the communication unit 130 includes a wireless communication module (for example, a cellular communication module, a Wi-Fi communication module, a short range wireless communication module, or a global navigation satellite system (GNSS) communication module) and/or a wired communication module and may communicate with an external device using a corresponding communication module among them. For example, the short range wireless communication module may include a Bluetooth communication module.

For example, communication performed through the communication unit 130 may include vehicle to everything communication (V2X communication).

The V2X communication is for the vehicle 1 to exchange information with other vehicles, mobile devices, and/or things on a road through a wired and/or wireless communication network.

The concept of V2X communication may include vehicle to vehicle (V2V) communication, vehicle to infrastructure (V2I) communication, vehicle to nomadic device (V2N) communication, and vehicle to pedestrian (V2P) communication.

The V2X communication is based on dedicated short-range communication (DSRC) and may use wireless access in vehicular environment (WAVE) which has been recently conducted by the Institute of Electrical and Electronics Engineers (IEEE) or IEEE 802.11p communication technology in which the 5.9 GHz band is used, but is not limited thereto, and should be understood as including any intervehicle communication currently or to be developed in the future.

In addition, the communication unit 130 may include a communication circuit capable of performing communication between components (or also referred to as devices) of the vehicle 1 through a vehicle communication network and/or a control circuit controlling operation of the communication circuit. For example, the components included in the vehicle 1 may transmit and receive data via Ethernet, media oriented systems transport (MOST), Flexray, a controller area network (CAN), a local interconnect network (LIN), or the like.

The sensing device 140 may be located inside and/or outside the vehicle 1 and may be used to acquire internal information and/or external information of the vehicle 1.

The sensing device 140 may include a camera 141, a radar 143, and/or a LIDAR 145.

The camera 141 may photograph the surroundings of the vehicle 1 and acquire image data of the surroundings of the vehicle 1. For example, the camera 141 may include a plurality of lenses (not shown), an image sensor (not shown), and/or an image processor (not shown).

The radar 143 may transmit transmission radio waves toward the outside of the vehicle 1 and detect an object outside the vehicle 1 based on reflected radio waves reflected from the external object.

The LiDAR 145 may be mounted outside a main body (not shown) of the vehicle 1 to acquire LiDAR data.

The driving device 150 moves the vehicle 1 and may include, for example, an engine (not shown), an engine management system (EMS) (not shown), a transmission (not shown), and a transmission control unit (TCU) (not shown). The engine generates power for the vehicle 1 to travel, and the EMS may control the engine in response to a driver's intention to accelerate through an accelerator pedal or a request from the controller 180. The transmission decelerates and transmits the power generated by the engine to the wheels, and the TCU may control the transmission in response to a driver's shift command through a shift lever and/or a request from the controller 180.

The braking device 160 stops the vehicle 1 and may include, for example, a brake caliper (not shown) and an electronic brake control module (EBCM) (not shown). The brake caliper may decelerate the vehicle 1 or stop the vehicle 1 using friction with a brake disc, and the EBCM may control the brake caliper in response to a driver's braking intention through the brake pedal and/or a request from the controller 180. For example, the EBCM may receive a deceleration request including a deceleration rate from the controller 180 and electrically or hydraulically control the brake caliper such that the vehicle 1 decelerates according to the requested deceleration rate.

The steering device 170 may include an electronic power steering device control module (EPS) (not shown) and/or an electronic stability control module (ESC) (not shown). The steering device 170 may change a traveling direction of the vehicle 1, and the EPS may assist operation of the steering device 170 such that a driver may easily manipulate a steering wheel in response to a driver's intention to steer through the steering wheel. In addition, the EPS may control the steering device in response to a request from the controller 180. For example, the EPS may receive a steering request including steering torque from the controller 180 and control the steering device 170 to steer the vehicle 1 according to the requested steering torque. The ESC may assist operation of the steering device 170 such that the driver may keep the vehicle 1 in a lane without losing steering ability when driving with sudden steering wheel manipulation and/or on a curved road.

The controller 180 may control the components of the vehicle 1, for example, the input device 110, the output device 120, the communication unit 130, the sensing device 140, the driving device 150, the braking device 160, and/or the steering device 170.

For example, the controller 180 may process data received from an external device, for example, the vehicle 2, through the input device 110 and/or the communication unit 130 and process data acquired from the sensing device 140.

In addition, the controller 180 may provide control signals to the output device 120, the communication unit 130, the driving device 150, the braking device 160, and/or the steering device 170 based on a processing result of the data received from the input device 110 and/or the external device and/or the processing result of the data acquired from the sensing device 140.

The controller 180 may include a memory 181 and/or a processor 183.

The memory 181 may store a program for processing each piece of data (for example, the data acquired through the sensing device 140 or data received from the external device (for example, the vehicle 2) and/or the input device 110) and/or data.

The memory 181 may temporarily store each piece of data and temporarily store a processing result of the processor 183 for each piece of data.

The memory 181 may include not only volatile memories such as an S-RAM and a D-RAM, but also non-volatile memories such as a flash memory, a read only memory (ROM), and an erasable programmable read only memory (EPROM).

The memory 181 may store degree-of-risk information including first degree-of-risk information corresponding to each type of pre-designated load and/or second degree-of-risk information corresponding to each weight of a pre-designated load.

For example, the types of pre-designated loads may include cement, steel, lumber, refined oil, gas (for example, combustible gas, and/or toxic gas), and the types of loads may be added, deleted, and/or changed by a manager.

For example, in the first degree-of-risk information corresponding to each type of pre-designated load, a degree-of-risk score (or a degree-of-risk level) may be pre-designated for each type of pre-designated load.

For example, the degree-of-risk score may be pre-designated for each type of load as follows. Gas is pre-designated with the highest first degree-of-risk score (or a first degree-of-risk level), refined oil is pre-designated with the second highest degree-of-risk score (or a second degree-of-risk level), and steel is pre-designated with the third highest degree-of-risk score (or a third degree-of-risk level). This is an example, and the degree-of-risk score corresponding to each type of load may be differently designated or changed by the manager.

The weight of the pre-designated load may be classified into a weight range of a first magnitude, a weight range of a second magnitude, and/or a weight range of a third magnitude (the weight range of the first magnitude<the weight range of the second magnitude<the weight range of the third magnitude) and pre-designated as such.

In addition, the weight range of the load may be pre-designated with a lower degree-of-risk score for a smaller weight as follows. The heaviest weight range is pre-designated with a first degree-of-risk score (or a first degree-of-risk level), and the weight range immediately below the heaviest weight range is pre-designated with a second degree-of-risk score (or a second degree-of-risk level). This is an example, and the degree-of-risk score corresponding to each weight of the load may be differently designated or changed by the manager.

The memory 181 may store control information of the vehicle 1 (also referred to as control information of a driving assistance function of the vehicle 1) corresponding to each pre-designated degree of risk.

The control information of the vehicle 1 corresponding to each pre-designated degree of risk may include control of changing a speed of the vehicle 1, control of an intervehicle distance between the vehicle 1 and the vehicle 2 located near the vehicle 1, control of changing a collision warning time point of the vehicle 1, and/or control of a lateral position of the vehicle 1.

For example, a speed limit (or also referred to as a maximum speed limit) of the vehicle 1 for each degree of risk may be pre-designated such that the speed of the vehicle 1 decreases as the degree of risk increases.

In addition, a limiting distance (also referred to as a minimum limiting distance) between the vehicle 1 and a preceding vehicle for each degree of risk may be pre-designated such that the intervehicle distance between the vehicle 1 and the preceding vehicle located near the vehicle 1 increases as the degree of risk increases.

In addition, a collision warning time point between the vehicle 1 and a vehicle located near the vehicle 1 for each degree of risk may be pre-designated such that the collision warning time point of the vehicle 1 is advanced as the degree of risk increases.

In addition, control information of a lateral position of the vehicle 1 for each degree of risk may be pre-designated such that a control reference interval in a lateral direction of the vehicle 1 is reduced (or an offset of the lateral deviation is reduced) in order to locate the vehicle 1 in a center within a travel lane for the vehicle 1 as the degree of risk increases.

The control information of the vehicle 1 corresponding to each pre-designated degree of risk may be differently designated or changed by the manager.

The processor 183 processes each piece of data to provide signals to the corresponding device for controlling each of the input device 110, the output device 120, the communication unit 130, the sensing device 140, the driving device 150, the braking device 160, and/or the steering device 170.

For example, the processor 183 may include a micro control unit (MCU).

The processor 183 may evaluate the risk of collision between the vehicle 1 and nearby objects through data acquired through the sensing device 140 (for example, classification, relative positions, and relative speeds of the nearby objects). For example, the processor 183 may calculate a time to collision (TTC) (or a distance to collision, DTC) between the vehicle 1 and the nearby object based on the position (the distance) and the relative speed between the vehicle 1 and a nearby object and evaluate the risk of collision between the vehicle 1 and the nearby object based on the TTC. The processor 183 may determine that the risk of collision is higher as the time until a collision is shorter.

The processor 183 may select a target object from among the objects near the vehicle 1 based on the risk of collision, for example, a time until a collision between the vehicle 1 and the nearby objects.

The processor 183 may generate a driving signal, a braking signal, and/or a steering signal based on the risk of collision with the target object.

For example, the processor 183 may warn the driver of a collision or transmit the braking signal to the braking device 160 based on a comparison between the TTC between the vehicle 1 and the target objects and a reference time. In addition, the processor 183 may transmit the steering signal to the steering device 170 to avoid a collision with the target object based on the comparison between the TTC between the vehicle 1 and the target object and the reference time.

The processor 183 may determine the degree of risk of the object loaded in the vehicle 1 based on information indicating the type and/or weight of the object loaded in the vehicle 1 and the first degree-of-risk information and/or the second degree-of-risk information stored in the memory 181.

For example, the processor 183 may identify a degree-of-risk score (or a degree-of-risk level) corresponding to the type of object loaded in the vehicle 1 and a degree-of-risk score (or a degree-of-risk level) corresponding to the weight of the object loaded in the vehicle 1 from the first degree-of-risk information and/or the second degree-of-risk information stored in the memory 181.

In a case where the processor 183 acquires only information indicating the type of object loaded in the vehicle 1 among the type and weight of the object loaded in the vehicle 1 and determines the degree of risk, the processor 183 may determine the degree-of-risk score (or the degree-of-risk level) corresponding to the type of object to be the degree of risk of the object loaded in the vehicle 1.

In a case where the processor 183 acquires only information indicating the weight of the object loaded in the vehicle 1 among the type and weight of the object loaded in the vehicle 1 and determines the degree of risk, the processor 183 may determine the degree-of-risk score (or the degree-of-risk level) corresponding to the weight of the object to be the degree of risk of the object loaded in the vehicle 1.

Further, in a case where the processor 183 acquires information indicating the type and weight of the object loaded in the vehicle 1, identifies the degree-of-risk score (or the degree-of-risk level) based on the type of object loaded in the vehicle 1, and identifies the degree-of-risk score (or the degree-of-risk level) based on the weight of the object loaded in the vehicle 1, the processor 183 may determine the degree of risk of the object loaded in the vehicle 1 by averaging the two degree-of-risk scores (or the two degree-of-risk levels).

Alternatively, the processor 183 may apply a first weighting value to the degree-of-risk score (or the degree-of-risk level) determined based on the type of object, apply a second weighting value to the degree-of-risk score (or the degree-of-risk level) determined based on the weight of the object, and then determine the result obtained by summing the degree-of-risk scores (or the degree-of-risk levels) to which each weighting value is applied as the degree of risk of the object loaded in the vehicle 1. For example, the first weighting value may be pre-designated to the degree-of-risk score (or the degree-of-risk level) based on the type of the object, and the second weighting value may be pre-designated to the degree-of-risk score (or the degree-of-risk level) based on the weight of the object. For example, the first weighting value may be pre-designated to be greater than or smaller than the second weighting value.

The processor 183 may control the communication unit 130 to transmit information including the determined degree of risk to the vehicle 2 located near the vehicle 1.

The processor 183 may control the vehicle 1 based on the determined degree of risk and vehicle control information corresponding to each pre-designated degree of risk stored in the memory 181.

For example, the processor 183 may identify the control information of the vehicle 1 corresponding to the determined degree of risk from the vehicle control information corresponding to each pre-designated degree of risk stored in the memory 181 and control the vehicle 1 according to the identified control information of the vehicle 1.

For example, the control of the vehicle 1 according to the identified control information of the vehicle 1 may include control of changing a speed of the vehicle 1, control of an intervehicle distance between the vehicle 1 and the vehicle 2 located near the vehicle 1, control of changing a collision warning time point of the vehicle 1, and/or control of a lateral position of the vehicle 1.

The processor 183 may control the communication unit 130 such that information for inducing the vehicle 2 located near the vehicle 1 to pass the vehicle 1 is transmitted to the vehicle 2 based on surrounding information of the vehicle 1 identified through the output data of the sensing device 140.

For example, the processor 183 may control the communication unit 130 such that information for inducing the vehicle 2 to pass the vehicle 1 is transmitted to the vehicle 2 in a case where the determined degree of risk is greater than or equal to a pre-designated reference degree of risk.

For example, the processor 183 may determine whether it is possible for the vehicle 2 to pass the vehicle 1 based on the surrounding information of the vehicle 1 identified through the output data of the sensing device 140 in a case where the determined degree of risk is greater than or equal to the pre-designated reference degree of risk. In addition, the processor 183 may control the communication unit 130 such that information for inducing the vehicle 2 to pass the vehicle 1 is transmitted to the vehicle 2 in a case where it is determined that it is possible for the vehicle 2 to pass the vehicle 1.

For example, the processor 183 may determine that it is possible for the vehicle 2 to pass the vehicle 1 in a case where it is identified that the following first and second conditions are satisfied based on the surrounding information of the vehicle 1.

First condition: a case where the number of travel lanes for the vehicle 1 is two or more or lane lines around the travel lane for the vehicle 1 are lane lines indicating that passing is possible Second condition: a case where no vehicle or object is present in front of or at either side of the vehicle 1

For example, the processor 183 may determine that it is possible for the vehicle 2 to pass the vehicle 1 in a case where it is identified that the following third condition is satisfied based on the surrounding information of the vehicle 1 in addition to satisfying the above-described first and second conditions.

Third condition 3: a case where the curvature of the travel lane for the vehicle 1 is smaller than a pre-designated reference curvature The vehicle 2 (also referred to as a second vehicle) may communicate with the vehicle 1 and include components corresponding to the components of the vehicle 1.

For example, the vehicle 2 may be one or more vehicles located at a distance where it is possible to communicate with the vehicle 1.

For example, the vehicle 2 may be a vehicle behind the vehicle 1, a vehicle at a lateral side of the vehicle 1, and/or a vehicle at a rear lateral side of the vehicle 1.

A processor (not shown) of the vehicle 2 may receive information including the degree of risk of the object loaded in the vehicle 1 through a communication unit (not shown).

In a memory (not shown) of the vehicle 2, pre-designated control information of the vehicle 2 corresponding to each degree of risk of the object loaded in a nearby vehicle (for example, the vehicle 1) (or also referred to as control information of a driving assistance function) may be stored.

For example, the control information of the vehicle 2 may include control information for securing a safe distance between the vehicle 2 and a nearby vehicle (for example, the vehicle 1) that transmits information including the degree of risk of the loaded object.

For example, the control information of the vehicle 2 may include information on control of an intervehicle distance between the vehicle 2 and a nearby vehicle (for example, the vehicle 1) that transmits information including the degree of risk of the loaded object and/or a change of a collision warning time point of the vehicle 2.

For example, a limiting distance (also referred to as a minimum limiting distance) between the vehicle 2 and a nearby vehicle (for example, the vehicle 1) for each degree of risk may be pre-designated such that a distance between the vehicle 2 and the nearby vehicle (for example, the vehicle 1) that transmits information including the degree of risk of the loaded object increases as the degree of risk of the loaded object increases.

In addition, a collision warning time point between the vehicle 2 and a nearby vehicle (for example, the vehicle 1) that transmits information including the degree of risk of the object for each degree of risk may be pre-designated such that the collision warning time point of the vehicle 2 is advanced as the degree of risk of the loaded object increases.

The processor (not shown) of the vehicle 2 may control the vehicle 2 based on received information including the degree of risk of the object loaded in the vehicle 1 and driving control information of the vehicle 2 which is stored in the memory (not shown), is pre-designated, and corresponds to each degree of risk of the object loaded in a nearby vehicle (for example, the vehicle 1).

The processor (not shown) of the vehicle 2 may receive information for inducing the vehicle 2 to pass the vehicle 1 from the vehicle 1 through the communication unit (not shown).

An output device (not shown) of the vehicle 2 may visually or aurally output information for inducing the vehicle 2 to pass the vehicle 1 (or also referred to as notification) such that the driver recognizes the information. Accordingly, the driver may step on an accelerator pedal of the vehicle 2 or manipulate a steering wheel to pass the vehicle 1.

Figure 2:
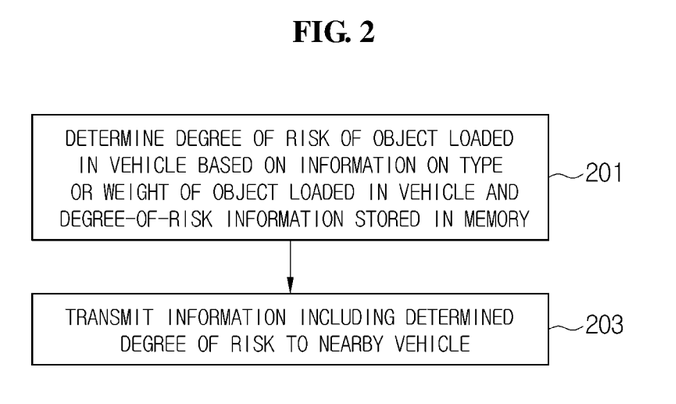
FIG. 2 is a flowchart of operations of a vehicle according to one embodiment.

FIG. 2 is a flowchart of operations of the vehicle 1 (and/or the processor 183) according to one embodiment.

Referring to FIG. 2, the vehicle 1 may determine the degree of risk of the object loaded in the vehicle 1 based on the information on at least one of the type or weight of the object loaded in the vehicle 1 and the degree-of-risk information stored in the memory 181 (201).

For example, the vehicle 1 may acquire the information on at least one of the type or weight of the object loaded in the vehicle 1 through the input device 110.

The vehicle 1 may transmit information including the determined degree of risk to a nearby vehicle (for example, the vehicle 2) (203).

The vehicle 1 may transmit information including the determined degree of risk to the nearby vehicle through communication (for example, the V2X communication) through the communication unit 130.

Figure 3:
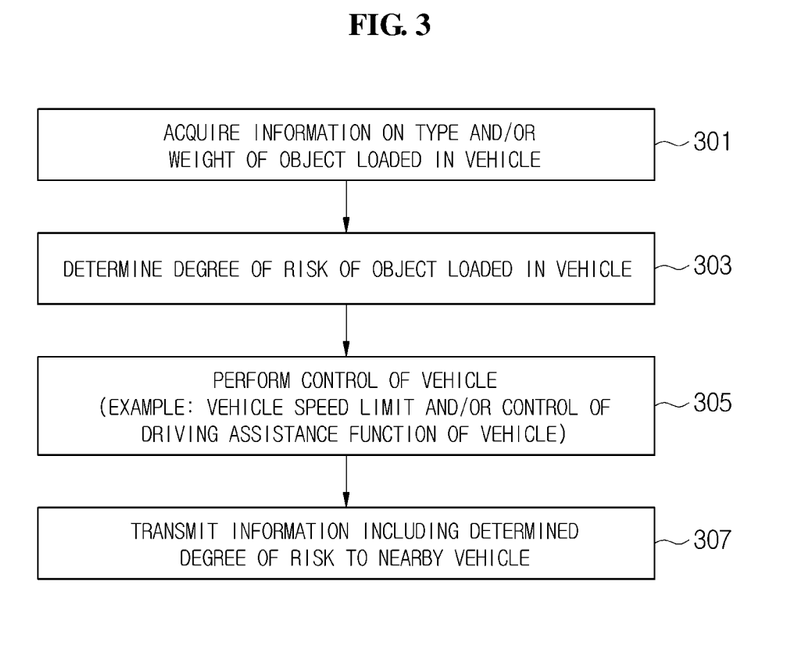
FIG. 3 is a flowchart of operations of a vehicle according to one embodiment.

FIG. 3 is a flowchart of operations of the vehicle 1 (and/or the processor 183) according to one embodiment.

Referring to FIG. 3, the vehicle 1 may acquire the information on the type and/or weight of the object loaded in the vehicle 1 through the input device 110 (301).

The vehicle 1 may determine the degree of risk of the object loaded in the vehicle 1 based on the information on the type and/or weight of the object loaded in the vehicle 1 and the degree-of-risk information stored in the memory 181 (303).

The vehicle 1 may perform control of the vehicle 1 (for example, vehicle speed limit and/or control of a driving assistance function of the vehicle 1) based on the determined degree of risk and the control information of the vehicle 1 corresponding to each pre-designated degree of risk stored in the memory 181 (305).

For example, the control of the vehicle 1 may include control of changing a speed of the vehicle 1, control of an intervehicle distance between the vehicle 1 and the vehicle 2 located near the vehicle 1, control of changing a collision warning time point of the vehicle 1, and/or control of a lateral position of the vehicle 1.

The vehicle 1 may transmit information including the determined degree of risk to the nearby vehicle (for example, the vehicle 2) through the communication unit 130 (307).

In the embodiment of FIG. 3 described above, operations 305 and 307 may be performed simultaneously, operation 307 may be performed after operation 305, or operation 305 may be performed after operation 307.

Figure 4:
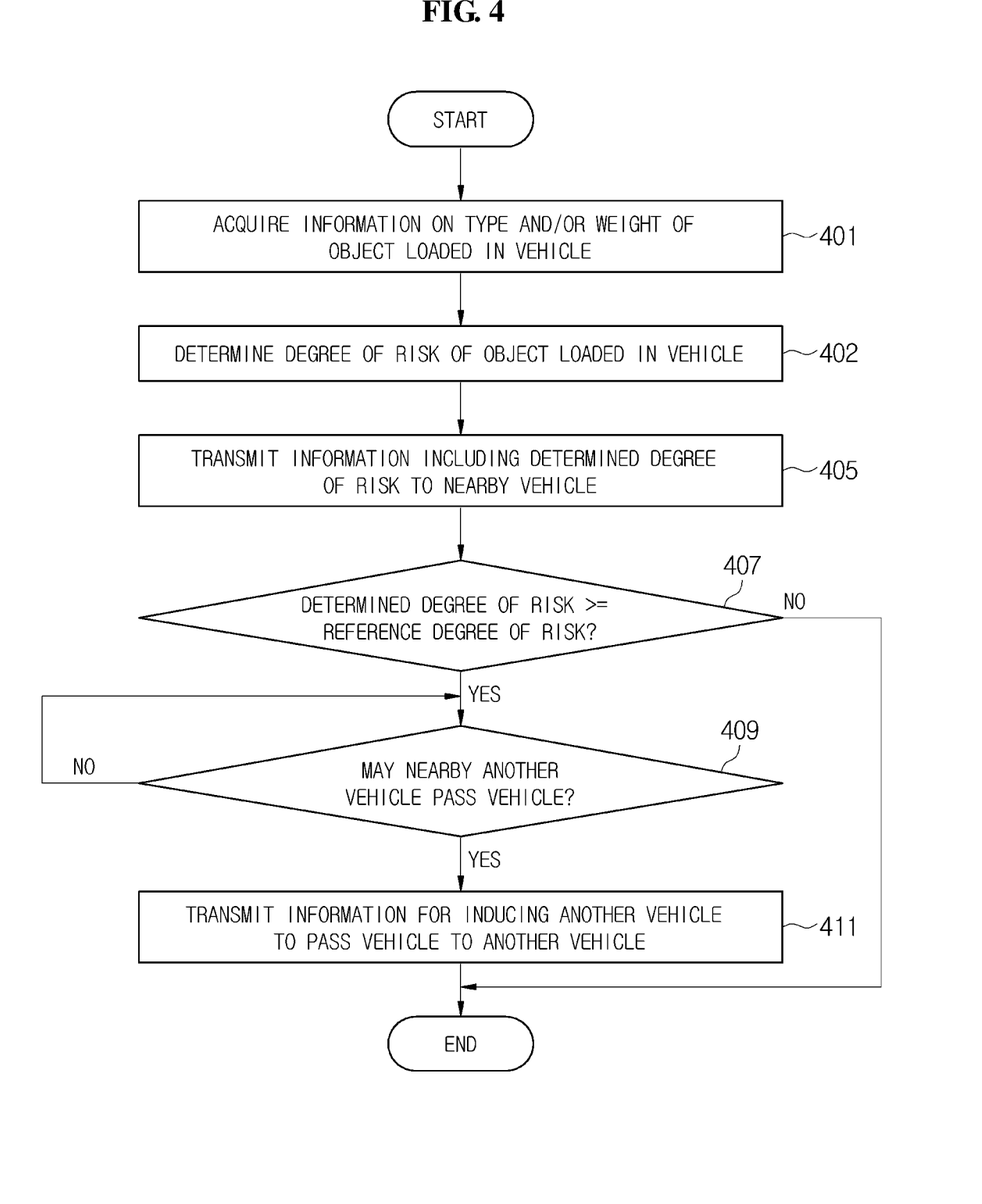
FIG. 4 is a flowchart of operations of a vehicle according to one embodiment.
Figure 5:
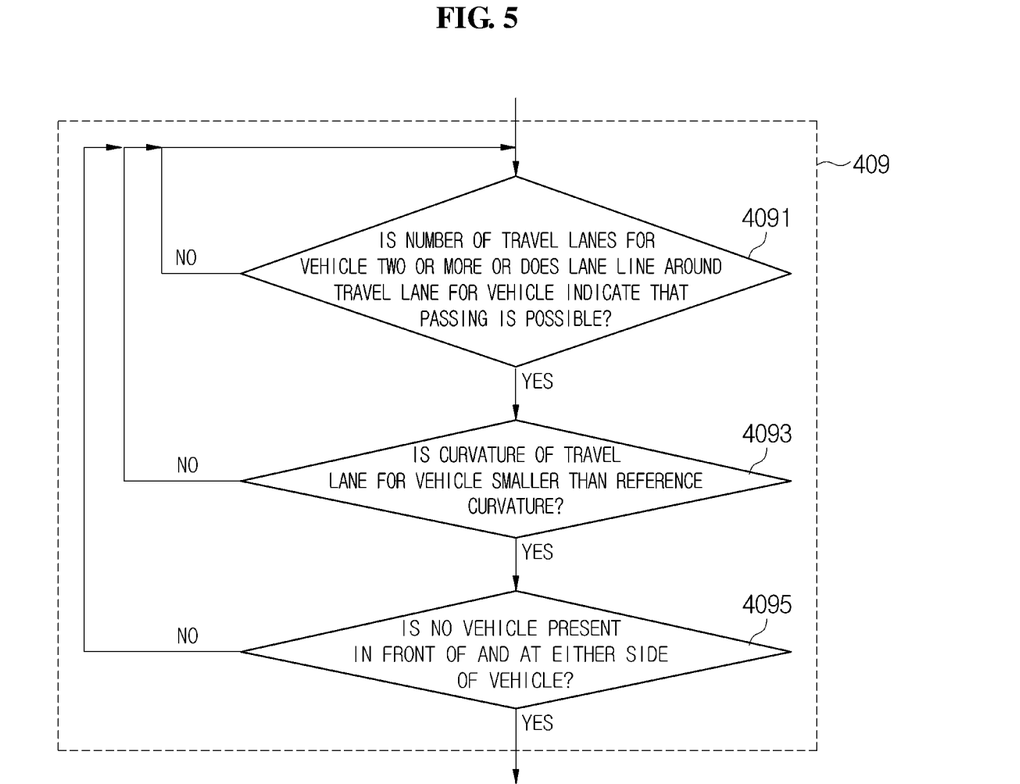
FIG. 5 is a flowchart of operations in which one vehicle determines whether another vehicle near the one vehicle may pass the one vehicle according to one embodiment.

FIG. 4 is a flowchart of operations of the vehicle 1 (and/or the processor 183) according to one embodiment. FIG. 5 is a flowchart of operations in which the vehicle 1 (and/or the processor 183) determines whether another vehicle (for example, the vehicle 2) near the vehicle 1 may pass the vehicle 1 according to one embodiment.

Referring to FIG. 4, the vehicle 1 may acquire the information on the type and/or weight of the object loaded in the vehicle 1 (401).

The vehicle 1 may determine the degree of risk of the object loaded in the vehicle 1 based on the information on the type and/or weight of the object loaded in the vehicle 1 (403).

The vehicle 1 may transmit information including the determined degree of risk to the nearby vehicle (for example, the vehicle 2) (405).

The vehicle 1 may determine whether the determined degree of risk is greater than or equal to a pre-designated reference degree of risk (407).

The vehicle 1 may perform operation 409 in a case where the determined degree of risk is greater than or equal to a pre-designated reference degree of risk and otherwise may end the operation of the present embodiment.

The vehicle 1 may determine whether another vehicle (for example, the vehicle 2) near the vehicle 1 may pass the vehicle 1 (409).

For example, another vehicle near the vehicle 1 may be a vehicle behind the vehicle 1, a vehicle at a lateral side of the vehicle 1, and/or a vehicle at a rear lateral side of the vehicle 1.

The vehicle 1 may perform operation 411 in a case where another vehicle near the vehicle 1 may pass the vehicle 1 and otherwise may end the operation of the present embodiment.

The vehicle 1 may determine whether another vehicle near the vehicle 1 may pass the vehicle 1 through operation shown in FIG. 5.

Referring to FIG. 5, the vehicle 1 may determine whether the number of travel lanes for the vehicle 1 is two or more or lane lines around the travel lane for the vehicle 1 are lane lines indicating that passing is possible (4091).

The vehicle 1 may perform operation 4093 in a case where the number of travel lanes for the vehicle 1 is two or more or lane lines around the travel lane for the vehicle 1 are lane lines indicating that passing is possible and otherwise may perform operation 4091 again.

For example, the vehicle 1 may determine that another vehicle may not pass the vehicle 1 in a case where the number of travel lanes for the vehicle 1 is not two or more or lane lines around the travel lane for the vehicle 1 are not lane lines indicating that passing is possible.

The vehicle 1 may determine whether the curvature of the travel lane for the vehicle 1 is smaller than a pre-designated reference curvature (4093).

The vehicle 1 may perform operation 4095 in a case where the curvature of the travel lane for the vehicle 1 is smaller than a pre-designated reference curvature and otherwise may perform operation 4091 again.

For example, in a case where the curvature of the travel lane for the vehicle 1 is greater than or equal to a pre-designated reference curvature, considering that there is a high possibility of an accident occurring when another vehicle tries to pass the vehicle 1, it may be determined that another vehicle may not pass the vehicle 1.

The vehicle 1 may determine whether no vehicle is present in front of and at either side of the vehicle 1 (4095).

For example, the vehicle 1 may determine whether another vehicle is present in front of and at either side of the vehicle 1 within a pre-designated reference distance from the vehicle 1.

The vehicle 1 may perform operation 411 in case where no vehicle is present in front of and at either side of the vehicle 1 and otherwise may perform operation 4091 again.

The vehicle 1 may determine that another vehicle may pass the vehicle 1 in a case where no vehicle is present in front of and at either side of the vehicle 1 and perform operation 411.

On the other hand, in a case where a vehicle is present in front of and at either side of the vehicle 1, the possibility of a collision accident is high when another vehicle tries to pass the vehicle 1, and thus the vehicle 1 may determine that it is not possible for another vehicle to pass the vehicle 1 and perform operation 4091 again.

The vehicle 1 may transmit information for inducing another vehicle to pass the vehicle 1 to another vehicle (411).

Meanwhile, operations 405, 407, and 409 may be sequentially performed after operation 403 in the above-described embodiment of FIG. 4, or operations 405 and 407 may be performed simultaneously after operation 403.

In addition, although it has been described that operations 405 and 411 are performed separately in the above-described embodiment of FIG. 4, according to another embodiment, the information including the degree of risk in operation 405 and information for inducing another vehicle to pass the vehicle 1 in operation 411 may be simultaneously transmitted to other vehicle.

In addition, in the above-described embodiment of FIG. 4, it has been described that operation 409 is performed in a case where the degree of risk determined according to operation 407 is greater than or equal to the pre-designated reference degree of risk. However, according to another embodiment, operation 407 may be omitted, and operation 409 may be performed immediately after operation 403 or 405.

Further, in the above-described embodiment of FIG. 5, it has been determined whether a vehicle is present in front of and at either side of the vehicle 1, but according to another embodiment, it may be determined whether only the vehicle but also an object, for example, a motorcycle, a bicycle, a person, a guardrail, or the like is present in front of and at either side of the vehicle 1.

For example, operation 411 may be performed in a case where no vehicle or another object is present in front of and at either side of the vehicle 1 and otherwise may perform operation 409 again.

Figure 6:
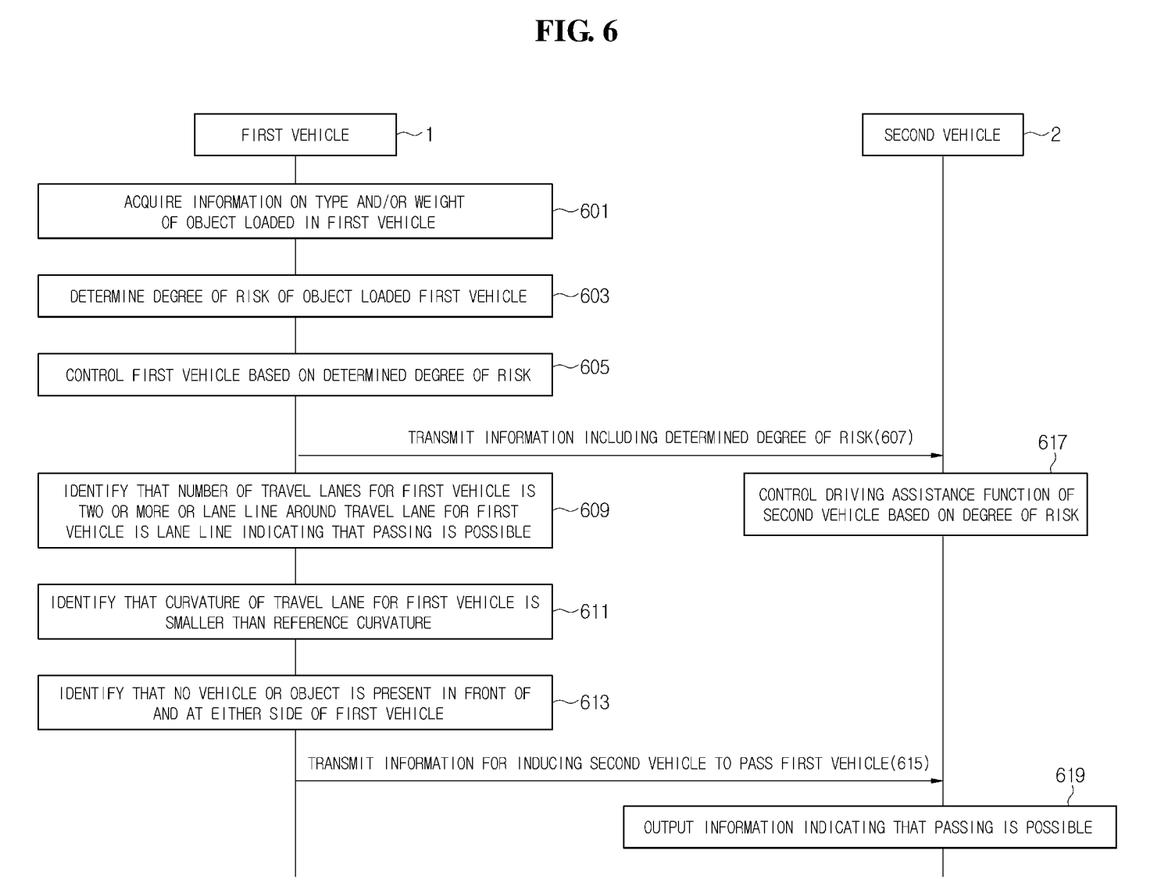
FIG. 6 is a flowchart of operations of vehicles according to one embodiment.

FIG. 6 is a flowchart of operations of vehicles (for example, the first vehicle 1 and the second vehicle 2) according to one embodiment.

Referring to FIG. 6, the vehicle 1 (and/or the processor 183) may acquire information on the type and/or weight of the object loaded in the first vehicle 1 (601).

The first vehicle 1 may determine the degree of risk of the object loaded in the first vehicle 1 based on the information on the type and/or weight of the object loaded in the first vehicle 1 and the degree-of-risk information stored in the memory 181 (603).

The first vehicle 1 may control the first vehicle 1 based on the determined degree of risk and control information of the vehicle 1 corresponding to each pre-designated degree of risk stored in the memory 181 (605).

The first vehicle 1 may transmit information including the determined degree of risk to the second vehicle 2 which is a vehicle near the first vehicle 1 through the communication unit 130 (607).

The first vehicle 1 may identify that the number of travel lanes for the first vehicle 1 is two or more or lane lines around the travel lane for the first vehicle 1 are lane lines indicating that passing is possible based on surrounding information of the first vehicle 1 identified through the output data of the sensing device 140 (609).

The first vehicle 1 may identify that the curvature of the travel lane for the first vehicle 1 is smaller than the reference curvature based on surrounding information of the first vehicle 1 identified through the output data of the sensing device 140 (611).

The first vehicle 1 may identify that no vehicle or object is present in front of and at either side of the first vehicle 1 based on surrounding information of the first vehicle 1 identified through the output data of the sensing device 140 (613).

The first vehicle 1 may transmit information for inducing the second vehicle 2 to pass the first vehicle 1 to the second vehicle 2 through the communication unit 130 (615).

Meanwhile, the second vehicle 2 may receive corresponding information according to the transmitting of the information including the degree of risk determined by the first vehicle 1. Accordingly, the second vehicle 2 may control a driving assistance function of the second vehicle 2 based on the degree of risk of the object loaded on the first vehicle 1 (617).

For example, the second vehicle 2 may control the second vehicle 2 based on the degree of risk of the object loaded in the first vehicle 1 and travelling control information of the second vehicle 2 which is stored in the memory (not shown), is pre-designated, and corresponds to each degree of risk of the object loaded in a nearby vehicle.

For example, the second vehicle 2 may perform control of the intervehicle distance with the first vehicle 1 and/or control of changing the collision warning time point of the second vehicle 2.

In addition, the second vehicle 2 may receive corresponding information according to the transmitting of the information for inducing the second vehicle 2 to pass the first vehicle 1 from the first vehicle 1. Based on this, the second vehicle 2 may output information indicating that it is possible to pass the first vehicle 1 through the output device 120 (619).

Accordingly, the driver of the second vehicle 2 may drive such that the second vehicle 2 passes the first vehicle 1.

According to the above-described embodiments, the driver of the vehicle (for example, the vehicle 2) located in the vicinity of the vehicle 1 loaded with an object having a high degree of risk, for example, behind the vehicle 1, at a lateral side of the vehicle 1, and/or at a rear lateral side of the vehicle 1 may check the degree-of-risk information and/or the information for inducing the vehicle 2 to pass the vehicle 1 and accordingly driving may be performed with awareness. Accordingly, when the object falls, a collision accident between a vehicle (for example, the vehicle 2) near the vehicle 1 and the object may be prevented.

In addition, according to the above-described embodiments, the vehicle 1 loaded with an object having a high degree of risk autonomously travels safely through the control of the speed and/or the driving assistance function of the vehicle 1, and the driver of a vehicle (for example, the vehicle 2) located near the vehicle 1 may also drive safely by checking the information received from the vehicle 1. Accordingly, the possibility of collision between the vehicle 1 loaded with an object having a high degree of risk and a vehicle (for example, the vehicle 2) travelling near the vehicle 1 may be blocked in advance, and thus a large-scale fire that may occur upon collision, a collision accident involving many vehicles, and the like may be blocked in advance.

As is apparent from the above description, a vehicle and a controlling method thereof according to an aspect of the present disclosure can prevent an accident situation that can occur in a vehicle loaded with an object having a high degree of risk and a vehicle travelling near the vehicle loaded with the object, for example, a collision accident caused by the object falling.

In addition, a vehicle and a controlling method thereof according to another aspect of the present disclosure can block the possibility of collision between a vehicle loaded with an object having a high degree of risk and a vehicle travelling near the vehicle loaded with the object in advance, and thus can block a large-scale fire that can occur upon collision, a collision accident involving many vehicles, and the like can be blocked in advance.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. A vehicle, comprising:
  a communication circuit configured to communicate with a nearby vehicle;
  a memory configured to store at least one piece of degree-of-risk information of first degree-of-risk information corresponding to each type of a pre-designated load or second degree-of-risk information corresponding to each weight of a pre-designated load; and
  a processor connected to the communication circuit and the memory,
  wherein the processor is configured to:
    determine a degree of risk of an object loaded in the vehicle based on information on at least one of a type and weight of the object loaded in the vehicle and the at least one piece of degree-of-risk information stored in the memory;
    control the communication circuit to transmit information including the determined degree of risk to the nearby vehicle; and
    in a case where the determined degree of risk is greater than or equal to a pre-designated reference degree of risk, control the communication circuit to transmit information for inducing the nearby vehicle to pass the vehicle to the nearby vehicle.

2. The vehicle of claim 1, further comprising:
  an input device configured to receive information according to a user's manipulation,
  wherein the processor acquires the information on the at least one of the type and weight of the object loaded in the vehicle through the input device.

3. The vehicle of claim 1, wherein
  the memory is configured to further store vehicle control information corresponding to each pre-designated degree of risk, and the processor is configured to control the vehicle based on the determined degree of risk and the vehicle control information corresponding to each pre-designated degree of risk stored in the memory.

4. The vehicle of claim 3, wherein the vehicle control information corresponding to each pre-designated degree of risk includes information on at least one control of control of changing a speed of the vehicle, control of an intervehicle distance between the vehicle and the nearby vehicle, control of changing a collision warning time point of the vehicle, and control of a lateral position of the vehicle.

5. The vehicle of claim 4, wherein the vehicle control information corresponding to each pre-designated degree of risk includes the information for at least one control of:
the control of changing speed of the vehicle to decrease the speed of the vehicle as the determined degree of risk increases;
the control of the intervehicle distance between the vehicle and the nearby vehicle to increase the intervehicle distance between the vehicle and the nearby vehicle as the determined degree of risk increases;
the control of changing the collision warning time point of the vehicle to advance the collision warning time point of the vehicle as the determined degree of risk increases; and
the control of the lateral position of the vehicle to control the vehicle to be located in a center of a lane as the determined degree of risk increases.

6. The vehicle of claim 1, further comprising at least one sensing device among a camera, a radar, and a Light Detection and Ranging (LiDAR),
wherein the processor is configured to control the communication circuit to transmit the information for inducing the nearby vehicle to pass the vehicle to the nearby vehicle based on surrounding information of the vehicle identified through output data of the at least one sensing device.

7. The vehicle of claim 6, wherein the processor is configured to:
determine whether the nearby vehicle is able to pass the vehicle in the case where the determined degree of risk is greater than or equal to the pre-designated reference degree of risk; and
control the communication circuit to transmit the information for inducing the nearby vehicle to pass the vehicle to the nearby vehicle in the case where it is determined that the nearby vehicle is able to pass the vehicle.

8. The vehicle of claim 7, wherein the processor determines that the nearby vehicle is able to pass the vehicle according to a determination that a number of travel lanes for the vehicle is two or more or a lane line around a travel lane for the vehicle is a lane line indicating that passing is induced and no vehicle is present in front of and at either side of the vehicle based on the surrounding information of the vehicle.

9. The vehicle of claim 8, wherein the processor determines that the nearby vehicle is able to pass the vehicle further based on a determination that a curvature of the travel lane for the vehicle according to the surrounding information of the vehicle is smaller than a pre-designated reference curvature.

10. A controlling method of a vehicle, comprising:
determining a degree of risk of an object loaded in the vehicle based on information on at least one of a type and weight of the object loaded in the vehicle and at least one piece of degree-of-risk information of first degree-of-risk information corresponding to each type of a pre-designated load or second degree-of-risk information corresponding to each weight of a pre-designated load stored in advance;
transmitting information including the determined degree of risk to a nearby vehicle; and
in a case where the determined degree of risk is greater than or equal to a pre-designated reference degree of risk, transmitting information on inducing the nearby vehicle to pass the vehicle to the nearby vehicle.

11. The controlling method of claim 10, further comprising acquiring the information on the at least one of the type and weight of the object loaded in the vehicle based on a user's input through an input device of the vehicle.

12. The controlling method of claim 10, further comprising controlling the vehicle based on the determined degree of risk and vehicle control information corresponding to each pre-designated degree of risk stored in advance.

13. The controlling method of claim 12, wherein the vehicle control information corresponding to each pre-designated degree of risk includes information on at least one control of control of changing a speed of the vehicle, control of an intervehicle distance between the vehicle and the nearby vehicle, control of changing a collision warning time point of the vehicle, or control of a lateral position of the vehicle.

14. The controlling method of claim 13, wherein the vehicle control information corresponding to each pre-designated degree of risk includes the information for at least one control of:
the control of changing speed of the vehicle to decrease the speed of the vehicle as the determined degree of risk increases;
the control of the intervehicle distance between the vehicle and the nearby vehicle to increase the intervehicle distance between the vehicle and the nearby vehicle as the determined degree of risk increases;
the control of changing the collision warning time point of the vehicle to advance the collision warning time point of the vehicle as the determined degree of risk increases; and
the control of the lateral position of the vehicle to control the vehicle to be located in a center of a lane as the determined degree of risk increases.

15. The controlling method of claim 10, wherein the transmitting of the information on inducing the nearby vehicle to pass the vehicle to the nearby vehicle is based on surrounding information of the vehicle identified through output data of at least one sensing device of a camera, a radar, or a Light Detection and Ranging (LiDAR).

16. The controlling method of claim 15, further comprising determining whether the nearby vehicle is able to pass the vehicle in the case where the determined degree of risk is greater than or equal to the pre-designated reference degree of risk,
wherein the transmitting of the information on inducing the nearby vehicle to pass the vehicle to the nearby vehicle is performed in the case where it is determined that the nearby vehicle is able to pass the vehicle.

17. The controlling method of claim 16, wherein the determining that the nearby vehicle is able to pass the vehicle is based on a determination that a number of travel lanes for the vehicle is two or more or a lane line around a travel lane for the vehicle is a lane line indicating that passing is induced and no vehicle is present in front of and at either side of the vehicle according to the surrounding information of the vehicle.

18. The controlling method of claim 17, wherein the determining that the nearby vehicle is able to pass the vehicle is further based on a determination that a curvature of the travel lane for the vehicle according to the surrounding information of the vehicle is smaller than a pre-designated reference curvature.

19. The vehicle of claim 1, wherein the processor is configured to
- identify a first degree-of-risk score corresponding to the type of the object and a second degree-of-risk score corresponding to the weight of the object based on the at least one piece of degree-of-risk information stored in the memory, and
- determine the degree of risk either by averaging the first degree-of-risk score and the second degree-of-risk score, or by summing a first result obtained by applying a first weighting value to the first degree-of-risk score and a second result obtained by applying a second weighting value to the second degree-of-risk score.

20. The controlling method of claim 10, wherein the determining of the degree of risk comprises:
- identifying a first degree-of-risk score corresponding to the type of the object and a second degree-of-risk score corresponding to the weight of the object based on the at least one piece of degree-of-risk information stored in the memory, and
- determining the degree of risk either by averaging the first degree-of-risk score and the second degree-of-risk score, or by summing a first result obtained by applying a first weighting value to the first degree-of-risk score and a second result obtained by applying a second weighting value to the second degree-of-risk score.

* * * * *